United States Statutory Invention Registration [19]

[11] Reg. Number: H812

George [43] Published: Aug. 7, 1990

[54] REINFORCED POLYMER

[75] Inventor: Eric R. George, Houston, Tex.

[73] Assignee: Shell Oil Company, Houston, Tex.

[21] Appl. No.: 289,155

[22] Filed: Dec. 23, 1988

Related U.S. Application Data

[63] Continuation-in-part of Ser. No. 137,800, Dec. 24, 1987, abandoned.

[51] Int. Cl.[5] ..... C08K 3/34

[52] U.S. Cl. ..... 524/444; 524/592; 524/612

[58] Field of Search ..... 524/612; 528/392

[56] References Cited

U.S. PATENT DOCUMENTS

| | | | |
|---|---|---|---|
| 2,495,286 | 1/1950 | Brubaker et al. | 260/63 |
| 3,694,412 | 9/1972 | Nozaki | 260/63 CQ |
| 3,929,727 | 12/1975 | Russell et al. | 260/48.95 F |
| 3,948,832 | 4/1976 | Hudgin | 260/23 EP |
| 3,948,850 | 4/1976 | Hudgin | 260/45.7 P |
| 3,948,873 | 4/1976 | Hudgin | 260/94.9 B |
| 3,968,082 | 7/1976 | Hudgin | 260/45.85 H |
| 3,979,373 | 9/1976 | Kiovsky | 562/12 |
| 4,024,104 | 5/1977 | Russell et al. | 260/45.8 R |
| 4,070,532 | 1/1978 | Hammer | 526/11.2 |
| 4,139,522 | 2/1979 | Lantor | 260/47.75 |
| 4,317,765 | 3/1982 | Gaylord | 523/204 |
| 4,430,468 | 2/1984 | Schumacher | 524/109 |

FOREIGN PATENT DOCUMENTS

| | | |
|---|---|---|
| 1081304 | 8/1967 | European Pat. Off. . |
| 2111513 | 7/1983 | European Pat. Off. . |
| 121965 | 10/1984 | European Pat. Off. . |
| 181014 | 5/1986 | European Pat. Off. . |
| 229408 | 7/1987 | European Pat. Off. . |
| 141662 | 6/1986 | Japan . |
| 115380 | 5/1988 | Japan . |

OTHER PUBLICATIONS

Tensile and Impact Strengths of Unidirectional, Short Fibre-Reinforced Thermoplastics, Composites, 1979, 111-19.

Mechanical Properties of Particulate Filled Polymers, Polymer Composites, 1987, 8(2), 115-22.

The Role of Aminosilanes on the Adhesion Promotion at the E-Glass/Poly(butylene Terephthalate) Interface, Session 21-D, The Society of Plastics Industry, Inc., Feb. 2-6, 1987.

Polymeric Silanes: An Evolution in Coupling Agents, Session 21-C; The Society of Plastics Industry, Inc. Feb. 2-6, 1987.

Adhesion Enhancing Additives for Silane Coupling Agents, Session 21-E; The Society of Plastics Industry, Inc., Feb. 2-6, 1987.

Ceramic Fiber: A New Alternative Short Fiber Reinforcement, The Society of Plastics Industry, Inc., Feb. 2-6, 1987.

Fiberfrax® Product Specifications Brochures of the Sohio Engineered Materials Company.

*Primary Examiner*—Robert L. Stoll
*Assistant Examiner*—Joseph D. Anthony

[57] ABSTRACT

Polymer compositions comprising linear alternating polymers of carbon monoxide and at least one ethylenically unsaturated hydrocarbon and an amount of ceramic fiber reinforcement.

10 Claims, No Drawings

---

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

REINFORCED POLYMER

This is a continuation-in-part of U.S. Ser. No. 137,800, filed Dec. 24, 1987, now abandoned.

FIELD OF THE INVENTION

This invention relates to certain polymer compositions having improved mechanical properties. More particularly, the invention relates to compositions comprising a linear alternating polyketone polymer reinforced with ceramic fibers.

BACKGROUND OF THE INVENTION

Polymers of carbon monoxide and olefinically unsaturated organic compounds, or polyketones, have been known and available in limited quantities for many years. For example, polymers of ethylene or ethylene-propylene which contain small quantities of carbon monoxide are disclosed in U.S. Pat. No. 2,495,286, prepared using free radical catalysts. British Pat. No. 1,081,304 discloses polymers containing higher concentrations of carbon monoxide prepared using alkylphosphine complexes of palladium salts as catalysts.

U.S. Pat. No. 3,948,873 issued to Hudgin, discloses a method of preparing ethylene-carbon monoxide copolymer using organic peroxide catalysts. The method involves polymerization of the monomers in the presence of a small amount of potassium dihydrogen phosphate.

U.S. Pat. No. 4,143,096 issued to Hudgin discloses graft interpolymers comprised of a polyolefin backbone polymer prepared from at least one alpha-olefin of two to four carbon atoms onto which is graft a copolymerized mixture of ethylene and carbon monoxide.

A special class of linear polyketones is disclosed in U.S. Pat. No. 3,694,412, wherein the monomer units of carbon monoxide and olefinically unsaturated hydrocarbons occur in alternating order.

Polyketones are of considerable interest because they exhibit good physical properties. In particular, the high molecular weight linear alternating polymers have potential use as engineering thermoplastics due to their high strength, rigidity and impact resistance. These polymers can be represented by the general formula $$-\overset{\overset{\displaystyle O}{\|}}{C}-(A)$$

wherein A is the moiety obtained by polymerization of the olefinically unsaturated organic compound through the olefinic unsaturation. A general process for preparing such linear alternating polymers is disclosed, for example, in published European Patent Applications 121,965 and 181,014. The process generally comprises contacting the monomers in the presence of a catalyst obtained from a compound of palladium, cobalt or nickel, the anion of a non-hydrohalogenic acid having a pKa less than about 2, and a bidentate ligand of phosphorus, arsenic or antimony. The resulting linear alternating polymers are generally high molecular weight thermoplastic polymers having utility in the production of articles for food and drink containers and for automobile parts.

Although the properties of the polyketones are suitable for many applications, certain mechanical properties of the polymer may be improved by the addition of glass fiber reinforcement. However, such reinforced polyketone compositions are not without their disadvantages, in particular, thermal instability during melt processing. It would be of advantage to provide fiber reinforced polyketone compositions that show improved melt processability over glass fiber reinforced polyketone compositions.

SUMMARY OF THE INVENTION

This invention relates to improved polymer compositions comprising a linear alternating polymer of carbon monoxide and at least one ethylenically unsaturated hydrocarbon and an amount of ceramic fiber reinforcement.

DESCRIPTION OF THE INVENTION

The polymers which are incorporated in the compositions of the invention are those linear alternating polyketones produced from carbon monoxide and at least one ethylenically unsaturated hydrocarbon. Suitable ethylenically unsaturated hydrocarbons for production of polyketones through polymerization with carbon monoxide are hydrocarbons of from 2 to 20 carbon atoms inclusive, preferably of up to 10 carbon atoms inclusive, and are aliphatic including ethylene and other alpha-olefins such as propylene, butene-1, isobutylene, octene-1 and dodecene-1, or are arylaliphatic containing an aryl substituent on an otherwise aliphatic molecule, particularly an alpha-olefin containing an aryl substituent on a carbon atom of the ethylenic unsaturation. Illustrative of this latter class are styrene, p-methylstyrene, m-ethylstyrene and p-propylstyrene. Preferred polyketone polymers for use in the compositions of the invention are copolymers of carbon monoxide and ethylene or terpolymers of carbon monoxide, ethylene and a second alpha-olefin of 3 or more carbon atoms, particularly propylene.

Of particular interest are the polyketones of molecular weight from about 1000 to about 200,000 especially those polymers of molecular weight from about 10,000 to about 50,000 and containing substantially equimolar quantities of carbon monoxide and ethylenically unsaturated hydrocarbon.

A method of producing polyketone polymers which is now becoming conventional is to contact the carbon monoxide and the ethylenically unsaturated hydrocarbon(s) under polymerization conditions in the presence of a catalyst formed from a metal compound of palladium, cobalt or nickel, an anion of a non-hydrohalogenic acid having a pKa less than about 6, preferably less than about 2, and certain bidentate ligands of nitrogen or of phosphorus, arsenic or antimony. Although the scope of the polymerization process is extensive, for purposes of illustration of a preferred method of producing the polyketone polymer, the metal compound is palladium acetate, the anion is the anion of trifluoroacetic acid or para-toluenesulfonic acid and the bidentate ligand is selected from 1,3-bis(diphenylphosphino)propane and 1,3-bis[di(2-methoxyphenyl) phosphino] propane.

Polymerization is typically carried out at elevated temperature and pressure in the gaseous phase in the substantial absence of reaction diluent or in the liquid phase in the presence of a reaction diluent such as a lower alkanol, e.g., methanol or ethanol. Suitable reaction temperatures are from about 20° C. to about 150° C. with preferred temperatures being from about 50° C. to about 125° C. The reaction pressure will typically be from about 1 bar to about 200 bar, preferably from about 10 bar to about 100 bar. The reactants and catalyst are contacted by conventional methods such as shaking or stirring and subsequent to reaction the polymer product is recovered as by filtration or decantation. The polymer product will, on occasion, contain metal or other residues of the catalyst which are removed, if desired, by treatment of the polymer product with a solvent or complexing agent or solvent which is selective for the residues. Production of this class of polymers is illustrated, for example, by copending U.S. patent application Ser. No. 935,431, filed Nov. 14, 1986 (Docket No. K-0722).

The physical properties of the polymer and the compositions of the invention will be in part determined by the molecular weight of the polymer, whether the polymer is a copolymer or terpolymer and which unsaturated hydrocarbons have been employed in its production. Suitable linear alternating polyketones for use in the invention have limiting viscosity numbers (LVN) as measured in m-cresol at 60° C., using a standard capillary viscosity measuring device, in the range of about 0.5 to about 10 LVN, more preferably from about 0.8 to about 4 LVN and most preferably from about 1.1 to about 2.5. Typical melting points of the polyketone polymers are from about 175° C. to about 300° C., more frequently from about 210° C. to about 260° C.

The structure of the polymer in the preferred modifications is that of a linear alternating polymer of units of carbon monoxide and ethylene and carbon monoxide and any second ethylenically unsaturated hydrocarbon if present. The preferred polyketone polymers contain substantially one carbon monoxide moiety for each moiety of unsaturated hydrocarbon. When terpolymers are produced from carbon monoxide, ethylene and a second ethylenically unsaturated hydrocarbon, e.g., an alpha-olefin of at least 3 carbon atoms such as propylene, there will be at least about 2 units incorporating a moiety of ethylene per unit incorporating a moiety of the second ethylenically unsaturated hydrocarbon. Preferably, there are from about 10 to about 100 units incorporating a moiety of ethylene per unit incorporating a moiety of the second ethylenically unsaturated hydrocarbon. The preferred class of polyketone polymers is therefore characterized by a polymer chain of the formula $$-[\overset{O}{\overset{\|}{C}}-(C_2H_4)]_x-[\overset{O}{\overset{\|}{C}}-(B)]_y- \qquad \text{I}$$

wherein B is the moiety obtained by the polymerization of the second ethylenically unsaturated hydrocarbon of at least 3 carbon atoms through the ethylenic unsaturation. By way of further illustration, when the second ethylenically unsaturated hydrocarbon is propylene, the B moiety will be $$-(CH_2-CH(CH_3))- \text{ or } -(CH(CH_3)-CH_2)-$$

depending upon the stereochemistry of the polymerization. The polyketone terpolymers of the invention may contain both types of B moiety randomly occurring along the polymer chain. The $$-\overset{O}{\overset{\|}{C}}-(C_2H_4)-$$

units and the $$-\overset{O}{\overset{\|}{C}}-(B)$$

units will also occur randomly throughout the polymer chain although the ratio of y:x in the above formula I will be no more than about 0.5. In the modification of the invention which employs copolymers of carbon monoxide and ethylene without the presence of a second ethylenically unsaturated hydrocarbon, the polymers are represented by the above formula I wherein y is zero. When y is other than zero, i.e. terpolymers are employed, ratios of y:x from about 0.01 to about 0.1 are preferred.

The linear alternating polyketones described by the above formula I will have end groups or "caps" which depend upon the particular components present during polymerization and whether and how the polymer is processed during any subsequent purification. The precise nature of such end groups or "caps" is not critical with regard to overall properties of the polymer, however, and the polymeric polyketones are fairly depicted through use of the polymer chain as depicted above.

The polymer compositions of the invention preferably comprise the above polyketone polymers incorporating uniformly therein a minor proportion, relative to the polymer, of fibrous ceramic reinforcement.

The reinforcing fiber suitable for use in the compositions of the invention is called refractory ceramic fiber, (RCF), also referred to as ceramic fiber or alumina-silica fiber. RCF is typically composed of about an equal parts blend of the oxides silica and alumina. In contrast to silicate glasses, such as E-glass or mineral fiber, RCF has only trace or slightly higher amounts of the oxides of alkali metals such as sodium, alkaline earth metals such as calcium, and oxides of other metals such as titanium, and iron. The very low amounts of alkali present in RCF provide a surface that is generally free of alkali metal ion exchange and interactions, and is inherently more resistant to moisture attack. Although there are few monovalent cations on the fiber surface, there are silanol groups (—Si—OH) on the surface which can interact to provide surface modification to a fiber/matrix interface.

Refractory ceramic fibers are conventionally prepared in a melting operation by fusing raw materials in an electric arc furnace to produce a molten stream. The molten stream is impinged on by air under high pressure or dropped on to spinning wheels which separates the stream into tiny fragments. The fragments form fiber and are rapidly cooled. Also produced in the melt process are molten droplets called "shot" which are spherical particles that do not transform into fibers. RCF can be processed to remove the shot, but typically the shot content does not significantly detract from the overall properties of the ceramic fiber. RCF is commercially available under the tradename Fiberfrax (TM) from Standard Oil Engineered Materials Company, Fibers Division and has traditionally been used in mat or textile form in high temperature applications such as furnace insulation. The fibers are also useful as reinforcements for polymeric products and are commercially used as such. However, the physical dimensions of the ceramic fibers are of some importance to successful utilization in a particular application as are the presence or absence of a sizing material or a coupling agent for the fibers and the nature of the sizing or coupling agent.

In the polyketone/ceramic fiber compositions of the invention, the ceramic fibers which contribute the most desirable properties to the composition are chopped ceramic fibers of circular cross-section. The fibers have an average diameter from about 1 micron to about 10 microns, preferably from about 2 microns to about 4 microns. Fibers of greater or lesser diameter are satisfactory but fibers of too small a diameter do not provided the desired strength and fibers of too large a diameter contribute too much weight for the resulting strength and may not be economical. Although in some applications the very short milled ceramic fibers or the long continuous ceramic fibers are satisfactory, in the compositions of the invention it is preferred to use short chopped ceramic fibers. Lengths of ceramic fiber from about 0.35 mm to about 15 mm are suitable. While somewhat longer or somewhat shorter lengths are also useful, too long a ceramic fiber detracts from the processability of the composition while too short a fiber does not provide the desired strength. It is recognized that the actual length of the ceramic fibers in the compositions will depend to some extent upon the method of blending or mixing the components, as this may mechanically break down the length of the ceramic fibers.

The ceramic fibers to be used as reinforcements for plastic materials may be provided by the manufacturer with a coating of a sizing material or a coupling agent, which terms are often used interchangeably. The nature of the sizing or coupling agent will influence the interfacial shear strength of the fiber and the copolymer matrix, i.e., the degree to which the polymer and ceramic fiber will adhere. Improvement in mechanical properties, such as tensile strength, result when a relatively high degree of adhesion occurs between the polymer and the fiber. To contribute strength to a polymer blend, the interfacial shear strength will be at least comparable in magnitude to the shear strength of the polymer so that there will be good adhesion between the polymer and the ceramic fiber. The interfacial shear strength is influenced by the polarity of the polymer so that for some polymers certain sizings or coupling agents work better than others. For the case of blends containing polyketone polymers a variety of sizings are suitable. Such sizings are generally characterized by the general nature of the size rather than the specific chemical structures which are often proprietary to the ceramic fiber manufacturer. Suitable sizings include water emulsions of starch and lubricating oil, aqueous dispersions of surface active materials and lubricants, silicon-containing materials such as vinyl silanes, alkyltrimethoxysilanes, amino silanes, trimethoxysilanes which may also contain urethane, acrylate or epoxy functionalities, and non-polar hydrocarbons. Ceramic fibers containing such sizings are commercially available and are exemplified by Fiberfrax® 6000 RPS Fiber and Fiberfrax® EF112 Fiber which are available from Standard Oil Engineered Materials Company, Fibers Division.

The amount of ceramic fiber to be incorporated into the compositions of the invention can vary. Preferably a minor amount relative to the polymer which is present as the major component in the total composition is used. Amounts of ceramic fiber loading from about 1% by weight to about 45% by weight, based on the total composition, are satisfactory with amounts from about 5% by weight to about 35% by weight, based on the total composition, being preferred.

The method of producing the compositions of the invention is not critical so long as an intimate mixture of the two components is produced without undue degradation of the components or the resulting composition. In one modification the components are dry mixed and converted to a blended composition by application of elevated temperature and pressure. In an alternate modification, the components are passed through an extruder to produce the composition as an extrudate. The components are also usefully blended in a mixer which operates at elevated temperature at high shear.

The compositions of the invention may also include additives such as antioxidants, stabilizers, pigments, fillers, and reinforcements, mold release agents, fire retarding chemicals and other materials which are designed to improve the processability of the polymer or the properties of the resulting composition. Such additives can be added together with, prior to or subsequent to the blending of the polymeric and glass fiber components.

The resulting compositions are processed by conventional methods such as injection molding, pressure forming, thermoforming, sheet extrusion and sheet casting which do not serve to degrade the polymer or the composition. The compositions have particular utility in the production of mechanical parts, such as automobile body panels, fenders, etc. particularly those having a large and continuous surface where strength, uniformity and appearance are important.

The polyketone polymer/ceramic fiber blend compositions of the invention are blends having mechanical properties such as flex modulus which are better than the neat polymer without the ceramic fiber component. In addition, the polyketone polymer/ceramic fiber compositions of the invention show certain improved properties over comparable polyketone polymers reinforced with glass fiber.

In particular, the ceramic fiber reinforced compositions appear to have a synergistic interaction to provide improved melt processability over glass reinforced compositions. Substituting ceramic fiber for glass fiber as polyketone reinforcement allows repetitive melt extrusions of the reinforced compositions before injection molding and improves cycle times for the molding. In terms of cycle times, melt processability for the ceramic fiber reinforced compositions is improved, i.e. shorter for ceramic fibers than for glass fiber reinforced compositions, and is a dramatic improvement in view of the neat polymer without any reinforcement component added.

The compositions of the invention are further illustrated by the following Illustrative Embodiments which should not be construed as limiting.

Illustrative Embodiment I

A linear alternating terpolymer of carbon monoxide, ethylene and propylene, Sample A, was prepared in the presence of a catalyst formed from palladium acetate, the anion of trifluoroacetic acid, and 1,3-[di(2-methoxyphenyl)phosphino]propane. Sample A polymer had a melting point of 220° C. and a limiting viscosity number (LVN) of 1.96 measured at 60° C. in m-cresol.

Illustrative Embodiment II

The terpolymer of Illustrative Embodiment I was blended with Fiberfrax® 6000 RPS ceramic fibers, commercially available from Standard Oil Engineered Material Company, Fibers Division. Fiberfrax 6000 RPS is a refractory ceramic fiber having a fiber length about 13 mm, a mean fiber diameter of 2–3 microns and a specific gravity of 2.73 g/cc. The ceramic fibers are sized with a commercial sizing designed for use with phenolic, epoxy, nylon, melamine and polyurethane systems. The components were extruded into water and pelletized. A sample of the terpolymer without ceramic fibers was also extruded and pelletized as a control. Samples were injection molded into standard ASTM tensile bars for testing. The pellets were dried prior to molding. Flex modulus and notched izod were measured by standard ASTM methods. The values for the terpolymer control and the reinforced composition are given in Table 1. The ceramic fiber reinforced composition showed a substantial increase in flex modulus over the non-reinforced sample.

TABLE 1

| Sample | RCF (%) | Notched Izod Room Temperature | Notched Izod −20° F. | Flex Modulus |
|---|---|---|---|---|
| Control | — | 4.8 | 1.2 | 240,000 |
| A | 5 | 2.5 | | 322,000 |

Illustrative Embodiment III

The terpolymer of Illustrative Embodiment I was blended with 10% by weight Fiberfrax® 6000 RPS ceramic fibers. A sample of the terpolymer was also blended with 10% by weight of commercially available Owens-Corning Fiberglass OCF 492 chopped glass fibers. OCF 492 is an E-type glass fiber having a density of about 2.60 g/cm$^3$. OCF 492 glass fibers are sized with a polar coupling agent for bonding to polyesters.

The components were blended using a 30 mm Haake twin screw extruder. The blends were extruded into water and pelletized and then re-extruded a second time and pelletized again. A sample of the terpolymer was extruded and pelletized twice also as a control.

Pellets of the terpolymer sample without reinforcement were injection molded to prepare standard ASTM tensile bars. Cycle times for the injection molding were about 10–20 seconds. Pellets of the 10% by weight Fiberfrax reinforced terpolymer were also injection molded to prepare standard tensile bars. The ceramic fiber reinforced composition was easily injection molded and cycle times of about 5.0 seconds were achieved. Attempts were made to injection mold the pellets of the glass reinforced composition but because of excessive viscosity of the compositions the attempts were unsuccessful.

It is known that the novel polyketone of this invention has different chemical sensitivities to different reinforcing components. More specifically, the novel linear alternating polymer reacts differently when exposed to mica versus mineral fillers, like Kaolin clay, glass fibers, ceramic fibers, calcium carbonate, or mica/glass fiber blends. These differing chemical sensitivities manifest in several distinct areas: (1) differences in flexural modulus (2) differences in tensile strength and notched izod values, (3) differences in processability or cycle time for the polymer, (4) differences in mold shrinkage predictability, (5) differences in heat deflection temperatures, and (6) differences in the ability to resist warpage once molded into an article.

For comparative purposes, three specific "neat" novel polyketones, noted hereafter as Control A, Control B, and Control C were prepared into test specimens.

More specifically, Control A was a specific linear alternating terpolymer prepared in the presence of a catalyst formed from palladium acetate, the anion of a trifluoroacetic acid and 1,3-bis(diphenylphosphino) propane. The polymer had a melting point of 220° C. and a limiting viscosity number of 1.96 as measured at 60° C. in m-cresol.

Control B was a blend of two specific linear alternating polymers. Control B comprised 33% of the novel polyketone polymer 088/005 and 67% of the novel polyketone polymer 088/006. Polymer 088/005 was a linear alternating terpolymer of ethylene and 7 wt % propylene prepared by employing a catalyst composition formed from palladium acetate, the anion of trifluoroacetic acid and 1,3-bis[di(methoxyphenol)phosphino]propane. Polymer 088/005 had a melting point of 220° C. and a limiting viscosity number (LVN) measured in 60° C. meta-cresol of 1.79. Polymer 088/006 was a linear alternating polymer prepared in a manner identical to the 088/005 polymer. The 088/006 polymer had a melting point of 223° C. and an LVN of 1.62. The neat polymer blend of Control B was formed by dry mixing pellets of the two polymers 088/005 with 088/006 in a conventional manner. The blended mixture was then melt blended in a 30 mm co-rotating twin screw extruder having seven zones and a total L/D of 27/1. The melt temperature at the die exit was 260° C. and the temperatures along the barrel were maintained at about 466° F.

Control C was a specific linear alternating polyketone polymer prepared by Shell Oil Company and known as 088/008. Polyketone polymer 088/008 was prepared in the presence of a catalyst formed from palladium acetate, the anion of trifluoroacetic acid and 1,3-bis(diphenyl phosphino)propane. The polymer had a melting point of 223° C. and a limiting viscosity number of 1.73 as measured at 60° C. in m-cresol.

Test specimens of the polymer Control A, B, and C, as well as blends using these Controls were prepared by compounding the polymer on a 30 mm, 27/1 L/D twin screw extruder. The material from the extruder was extruded into water and pelletized. The pellets were dried and injection molded. An Engel (8 oz.) injection molder equipped with a 2.2/1 compression ratio screw was used for several moldings. The cycle time for the samples varied depending on the blend combination used in the equipment. The molder formed standard family test specimens which were tested using the ASTM tests, noted above.

Controls A, B, and C were evaluated for flexural modulus (in psi), tensile strength (in psi), and Notched Izod in ft-lb/in at room temperature and at −20° F. Additionally, Control B was evaluated for its heat deflection temperature and Control C was evaluated for its mold shrinkage value. Flexural modulus was determined using ASTM D-790. Tensile strength was determined using ASTM D-638. Notched Izod determination was made using ASTM D-256.

The specific reinforcing components provided different strength and modulus values when blended with the Controls A, B, and C. Certain of these components appear to act synergistically with the novel polyketone causing a definite change in the properties of the polyketone with each blend.

For example, polymer blends that exhibited the best strength, incorporated the long glass fibers and long ceramic fibers. The mica/glass fiber blends were good, but not as good as the glass fibers when used separately with the polyketone or the ceramic fibers used alone with the polyketone. Mica provided a polymer with strength characteristics that were better than the neat polymer control but which were not as good as the mica/glass/polyketone combination. High aspect ratio mica platelets provided good strength, but not quite as good strength as the fibers. High aspect ratio mica/-polyketone blends were stronger than blends of low aspect platelet fillers, such as glass flakes with the novel polyketone. Stubby fibers such as Wollastinite, and Kaolin were not as good as low aspect platelets for improved strength in the blends, but they were better than spherical particles, like calcium carbonate. Details of these generalizations can be seen on the attached Table 2.

Using the control polymers described above, blends were prepared of using varying amounts of mica, glass fiber, mica/glass fiber blend, ceramic fiber, calcium carbonate and mineral filler. The neat polymer was blended with the indicated weight percent of reinforcing component using a 30 mm extruder similar to the one described in the above Illustrative Embodiments. The blended samples were extruded, pelleteized and formed into family test bars for testing in a manner identical to the neat polymer.

The different reinforcing components had different effects on the cycle time needed for molding and the ultimate processability of the neat polyketones. For example, mica had a clear positive effect on melt processability, while Kaolin clay had a negative effect on melt processability. Microwhite, which was calcium carbonate additionally modified with stearic acid, had short term improved melt processability but decreasing processability effectiveness over time. Clearly, these three reinforcing components were not alike in their effect on the novel linear alternating polyketone polymer.

The differing reinforcing components had different responses with the polyketone in view of the moldability of the polymer. In particular, from best to worst, mica/glass/polyketone blends exhibited very good thermostability and therefore good moldability, glass fiber/polyketone blends were next, followed very closely, almost at the same level by ceramic fiber/-polyketone blends, and finally particulate mineral filled polyketone blends came last.

The differing reinforcing components had different effects on the polyketone polymer's heat deflection temperature. From best to worst, were the glass fiber combination followed by mica/glass, then mica fibers, followed by ceramic fibers and finally mineral fillers as shown in the data of Table 2.

Lastly, different reinforcing components affected the polyketone's ability to warp. From most "resistant to warpage" to "least resistant to warpage" were the components mica, mica/glass fibers, mineral fillers, and calcium carbonate. Glass fibers and ceramic fibers did not provide warpage control, and in fact, they made the polyketone molded articles warp worse than they warped in neat form.

Mica was unlike other types of reinforcing components when used in association with the novel polygons of polyketone. The mica improved the modulus, stress at yield, and reduced elongation of the polyketone. Further, the addition of mica prevented stress whitening. Mica further controlled warpage by disturbing the normal polyketone molecular orientation though its interaction with the platelets.

Ceramic fiber/polyketone blends uniquely had shorter cycle times than other polyketone polymer/-reinforcing component blends. Ceramic fibers improved the processability of the neat polymer. Ceramic fibers allowed repeated melt extrusion of the blend without harming additional polyketone polymer properties.

Glass fiber was a material unique in its interaction with the novel polyketones. Glass fiber not only improved mold shrinkage of the polymer by decreasing shrinkage, but glass fiber improved the notched izod and modulus of the resultant blend, in comparison to mineral fillers particularly when glass fibers were used in the 10–30% range. However, glass fibers provided limited improved polymer viscosity over time.

Mineral fillers were unlike other reinforcing components, because of their own unique chemical interactions with the polyketone. Among their unique interactions, certain mineral fillers, like Wollastinite improved melt viscosity, and melt stability of the polymer in view of the control.

TABLE 2

| | Flex Modulus (psi) | Tensile Strength (psi) | Notched Izod Room Temperature (ft-lb/in) | Notched Izod −20° F. (ft-lt/in) | Cycle Time[1] process-ability | Mold shrink | Heat[3] Deflection Temperature (F.) | Warpage[4] |
|---|---|---|---|---|---|---|---|---|
| CONTROLS | | | | | | | | |
| Control A[5] | 240,000 | 7000–8000 | 4.8 | 1.2 | — | — | — | — |
| Control B[6] | 263,000 | ~7000–8000 | 3.0 | — | — | — | 205 | — |
| Control C[7] | ~200,000–250,000 | 7000–8500 | ~4.3 | ~1.1 | — | ~2.9 | — | — |
| Mica[8] Blends | | | | | | | | |
| 10 wt %[13] | ~310,000 | ~8500 | 0.6–0.75 | — | short & good | somewhat | ~250–260 | best when compared with control |
| 1 wt %[13] | ~265,000 | ~6500 | ~3.75–5 | — | short & good | somewhat | | best when compared with control |
| Glass Fiber[9] Blends | | | | | | | | |
| w/polar sized 9.9 wt %[5] | 304,000 | 10,300 | 2.1 | 0.9 | — | 1.02 | — | worse than control |

TABLE 2-continued

| | Flex Modulus (psi) | Tensile Strength (psi) | Notched Izod Room Temperature (ft-lb/in) | Notched Izod −20° F. (ft-lt/in) | Cycle Time[1] process-ability | Mold shrink | Heat[3] Deflection Temperature (F.) | Warpage[4] |
|---|---|---|---|---|---|---|---|---|
| w/o polar sized 9.9 wt %[5] | 230,000 | 8300 | 1.7 | 0.8 | — | 1.75 | — | worse than control |
| (causes anisotropic effects due to orientation of fiber) | | | | | | | | |
| Mica/Glass Fiber[10] Blends | | | | | | | | |
| 10 wt % mica + 5 wt %[6] | 400,000 | 8200–7500 | 1.8 | 0.9 | | 2.1 | 240 | some good results in view of control |
| Ceramic Fiber[11] Blends | | | | | | | | |
| 10 wt %[5] | — | — | — | — | 5 sec. | lots of shrinkage A[1] | — | worse than control |
| 5 wt %[5] (causes non-linear aspect ratio - orients polymer molecules in flow direction) | 322,000 | — | 2.5 | — | — | — | — | — |
| Calcium Carbonate[12] Blends | | | | | | | | |
| 10 wt %[13] | 305,000 | 9366 | — | — | — | good + short A[2] | — | — |
| Mineral filler Blends | | | | | | | | |
| 10 wt % Wollasitinite[13] | 301,000 | 8500–9200 | - | - | - | good when compared with control | — | good control |

[1]Amount of time it takes to process the polymer through a mold cycle.
[2]Mold shrinkage is determined by measuring by inspection of edge gated rectangular plaques over time.
[3]°F. at 264 psi.
[4]Warpage is a visual inspection test, when polymer refuses to hold shape warpage occurs.
[5]Using EP terpolymer MP 220, LVN 1.96 at 60° C. m-cresol.
[6]Using 33/67 blend of EP terpolymers 88/005 + 88/006, blend has mp 220–223, LVN 1.73.
[7]EP, mp 223, LVN 1.73 = 88/008.
A[3] mica in particular Asprapearl was used with EP polymer having an LVN of 215–220° C.
[9]Owens Corning Fiberglass 492 polar sized glass fiber and OCF457 was non-polar sized glass fibers were used.
[10]Using 37/67 blend of 88/005 + 88/006 + 2 wt % processing aid EAA + 2.5 wt % pigment.
[11]Fiberfrax ® 6000 RPS ceramic fiber not ground, long fibers from Standard Oil Engineered Material Co. was used.
[12]Calcium carbonate used herein was microwhite, a $CaCo_3$ with stearic acid added.
[13]Using EP terpolymer MP223 LVN 1.73 = 88/008 and Vansil as Wollastinite.

What is claimed is:

1. A polymeric composition comprising a linear alternating polymer of carbon monoxide and at least one ethylenically unsaturated hydrocarbon and an amount of ceramic fiber reinforcement wherein the fibers have an average diameter from about 1 micron to about 10 microns and a length of about 0.35 mm to about 15 mm.

2. The composition of claim 1 wherein the refractory ceramic fiber is present in an amount from about 1% by weight to about 45% by weight, based on the total composition.

3. The composition of claim 2 wherein the ethylenically unsaturated hydrocarbon is ethylene.

4. A polymeric composition comprising a linear alternating polymer of the formula $$\left[\overset{O}{\overset{\|}{C}}\left(C_2H_4\right)\right]_x\left[\overset{O}{\overset{\|}{C}}-(B)\right]_y$$

wherein B is the moiety of an ethylenically unsaturated hydrocarbon of at least 3 carbon atoms polymerized through the ethylenic unsaturation, the ratio of y:x is no more than about 0.5, and a quantity of refractory ceramic fiber reinforcement is incorporated therein, wherein the fibers have an average diameter from about 1 micron to about 10 microns and a length from about 0.35 mm to about 15 mm.

5. The composition of claim 4 wherein the quantity of refractory ceramic fiber is from about 1% by weight to about 45% by weight, based on total composition.

6. The composition of claim 4 wherein the quantity of refractory fiber is from about 5% by weight to about 35% by weight, based on total composition.

7. The composition of claim 5 wherein the ethylenically unsaturated hydrocarbon is an alpha-olefin having from 3 to 10 carbon atoms.

8. The composition of claim 6 wherein the alpha-olefin is propylene and the ratio of y:x is from about 0.01 to about 0.1.

9. The composition of claim 5 wherein y is zero.

10. As an article of manufacture, a molded article comprising the composition of claim 1.

* * * * *